Oct. 21, 1930.  E. C. SCHMITT  1,779,015

SAFETY DEVICE FOR GLASSES

Filed Sept. 8, 1927

ERNEST C. SCHMITT, INVENTOR

BY Merrill M. Blackburn

ATTORNEY

Patented Oct. 21, 1930

1,779,015

UNITED STATES PATENT OFFICE

ERNEST C. SCHMITT, OF DURANT, IOWA, ASSIGNOR OF ONE-HALF TO LOUIS TREDE

SAFETY DEVICE FOR GLASSES

Application filed September 8, 1927. Serial No. 218,177.

My present invention pertains to eyeglasses and spectacles and more particularly to a device integral therewith or attachable thereto which will minimize the danger of loss thereof when the same is not being worn upon the head.

Among the objects of this invention are to provide means for preventing glasses from falling out of a pocket; to provide glasses with means whereby they may be secured to an article of wearing apparel to be supported thereby; to provide means for minimizing the loss of glasses; to provide means for the purpose stated which can be easily applied to glasses and will, when so applied, remain in place thereon unless force is applied to remove same; and such further objects, advantages and capabilities as will hereafter appear and as are inherent in the construction disclosed herein. My invention further resides in the combination, construction and arrangement of parts illustrated and, while I have disclosed what is now considered the preferred form of my invention and modifications thereof, I desire this disclosure to be understood as illustrative only and not in a limiting sense.

In this specification and the appended claim the words "glasses", "eyeglasses", and "spectacles" are used generically, except when some other interpretation is required by the context, to denote any of various types of construction which are worn upon the face to assist or improve the vision.

Figure 1:
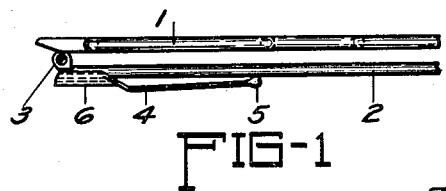
Figure 2:
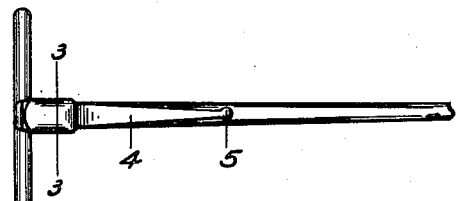
Figure 3:
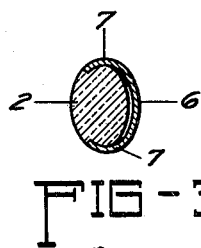
Figure 4:
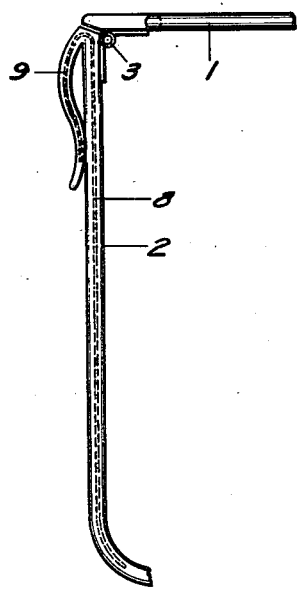
Figure 5:
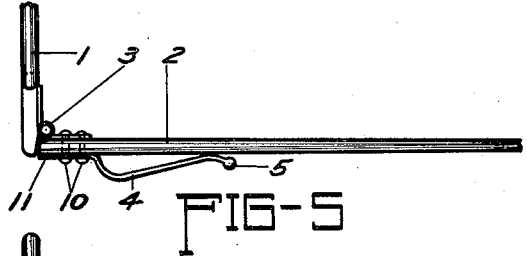
Figure 6:
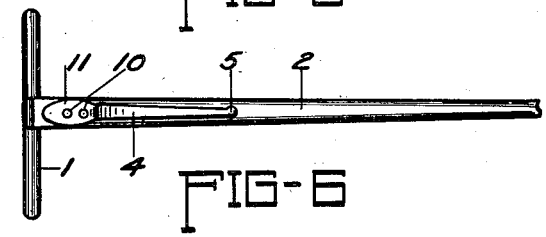
Figures 7, 8:
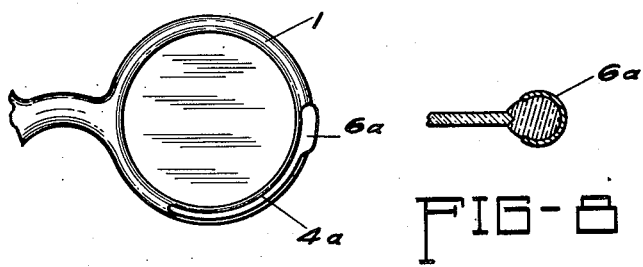

In the annexed drawing, Fig. 1 shows in fragmentary form a portion of a pair of spectacles having one of my devices secured to a temple thereof adjacent its hinge connection with the frame; Fig. 2 is an end elevation of the structure shown in Fig. 1, with the temple in opened position; Fig. 3 is a transverse section thru the temple and clip substantially along the plane indicated by the line 3—3, Fig. 2; Fig. 4 is a plan view of a portion of a pair of spectacles embodying a temple having a modified form of my invention applied thereto; Fig. 5 is a view similar to Fig. 4 in which a different type of clip is used; Fig. 6 is a view similar to Fig. 5 taken at a right angle thereto; Fig. 7 is a fragmentary elevation of glasses not provided with temples, but having my improvement applied thereto; Fig. 8 is a transverse section through the right side of Fig. 7 to show how the clip is attached to the lense frame.

Referring more in detail to the annexed drawing, numeral 1 denotes the frame and 2 a temple of a pair of spectacles hingedly connected together at 3 as is well understood in the art. A clip 4 of suitable form is carried by the temple 2 and preferably, tho not necessarily, has a head 5 for engagement with an article of clothing to hold the glasses where desired when same are not upon the face. In this form of construction a clamping member 6 is integral with the shank of spring clip 4. This clamping member is preferably curved inwardly at or adjacent its edges as shown at 7 in Fig. 3. When the temple is made of zylonite or other similar material, the clamping end of the device may be heated so as to soften the material of the temple and it may then be slid endwise thereon to the position shown in Figs. 1 and 2. When the device is properly shaped it will be rigidly held in the temple with the head 5 engaging the same so that when mounted upon the edge of a pocket the glasses will be securely fastened thereto and there will be no danger of loss of same. In the construction shown in Fig. 4 a spring wire 8 is provided in the temple and extends into the clip 9 as shown in Fig. 4. This spring wire has the functions of making the clip more resilient and of preventing the same from being broken off from the temple of which it forms an integral part.

The construction shown in Figs. 5 and 6 bears a closer resemblance to that shown in Figs. 1 and 2 but does not have the clamping part 6, being secured to the temple, instead, by rivets 10 passing thru the hinge, temple and the attaching end 11 of the clip.

In the construction of Fig. 7, a pair of eyeglasses having no temples for the attachment of the clip is shown. In this instance, the shank 4ª of the clip is provided with a clamping member 6ª similar to the clamping member 6 described above. In this form the clip is curved to lie along the rim of the glasses, either in front or behind the same, as preferred. Naturally, suitable means for attaching these glasses to the face must be provided but it is not necessary to show the same in the present drawing.

Having now described my invention, I claim:

A spectacles frame comprising: a pair of lens rims connected by a nose rest; bows hingedly provided upon said rims; and a yieldable retaining clip secured to one of said bows, said clip being yieldably urged towards the bow upon which it is secured in such a manner that when said frame is folded and placed in a wearing apparel pocket the fabric edge of said pocket will be tightly gripped when placed between said clip and the bow upon which it is secured.

In witness whereof, I hereunto subscribe my name to this specification.

E. C. SCHMITT.